US008884896B2

(12) United States Patent
Tabone et al.

(10) Patent No.: US 8,884,896 B2
(45) Date of Patent: Nov. 11, 2014

(54) COMPUTING DEVICE USER PRESENCE DETECTION

(75) Inventors: Ryan Tabone, San Francisco, CA (US); Anton Valdemar Staaf, San Jose, CA (US)

(73) Assignee: Google Inc., Mountain View, CA (US)

( * ) Notice: Subject to any disclaimer, the term of this patent is extended or adjusted under 35 U.S.C. 154(b) by 168 days.

(21) Appl. No.: 13/352,918

(22) Filed: Jan. 18, 2012

(65) Prior Publication Data

US 2013/0181936 A1 Jul. 18, 2013

(51) Int. Cl.
*G06F 3/041* (2006.01)
(52) U.S. Cl.
USPC ............ 345/173; 713/320; 713/324; 345/174
(58) Field of Classification Search
None
See application file for complete search history.

(56) References Cited

U.S. PATENT DOCUMENTS

| 2005/0088416 | A1 | 4/2005 | Hollingsworth |
| 2005/0248534 | A1 | 11/2005 | Kehlstadt |
| 2008/0278355 | A1 | 11/2008 | Moore et al. |
| 2009/0167719 | A1* | 7/2009 | Woolley ........................ 345/174 |
| 2009/0219255 | A1* | 9/2009 | Woolley et al. ............... 345/173 |
| 2009/0244092 | A1* | 10/2009 | Hotelling ...................... 345/619 |
| 2011/0007021 | A1* | 1/2011 | Bernstein et al. ............. 345/174 |
| 2011/0163976 | A1* | 7/2011 | Barnhoefer et al. .......... 345/173 |
| 2011/0298735 | A1* | 12/2011 | Kamaeguchi et al. ........ 345/173 |

OTHER PUBLICATIONS

George, et al, "A Combined Inductive-Capacitive Proximity Sensor and Its Application to Seat Occupancy Sensing", Proceedings of the International Instrumentation and Measurement Technology Conference, May 5, 2009, pp. 13-17.
Kim, et al, "Design of Automatic Energy Saving Monitor for Reducing the Waste of PC Electricity", Proceedings of the 7th International Conference on Networked Computing, Sep. 26, 2011, pp. 28-31.
International Search Report and Written Opinion for PCT/US2013/021922, mailed May 1, 2013, 13 pages.

* cited by examiner

Primary Examiner — Adam R Giesy

(57) ABSTRACT

A computing device may detect the presence of a user after the user has not interacted with the computing device for a predetermined time period. The user may leave the device powered up, but after the predetermined time period has expired, the device enters a user detection mode from a normal operation mode such that nonessential components are powered down. A trackpad may be used to detect the presence of the user in the user detection mode. An electric field is generated by conductive plates of the trackpad. When the user extends his hand over the trackpad, sense lines in the track pad detect the interference with the electric field caused by the hand. A processor is signaled to return the device normal operation mode and restore full power to the device. A camera may be also used to detect the user's presence during the user detection mode.

21 Claims, 6 Drawing Sheets

COMPUTING DEVICE USER PRESENCE DETECTION

BACKGROUND

Most computing devices enter a stand-by mode from an operation mode if a user does not interact with the device for a specific time period. The stand-by mode of the device promotes power conservation because the device is operating at low power. To reduce power consumption during stand-by mode, the display may be dimmed or completely darkened until the device is returned to the operation mode. In order to return the device to operation mode from stand-by mode, the user is commonly required to provide active input to the device such as by pressing any key on the keyboard or moving the mouse. In response, the device may take a few seconds before the device returns to the operation mode and is fully responsive to additional user input.

SUMMARY

Aspects of the present disclosure relate generally to detecting a user's presence in the vicinity of a computing device using existing device components. When a user has not interacted with the computing device for a predetermined time period, the device enters a user detection mode from a normal operation mode such that nonessential components are powered down or are provided with low level power. In one embodiment, a trackpad may be used to detect the presence of the user in the user detection mode. An electric field is generated by conductive plates of the trackpad. When the user extends his hand over the trackpad to interfere with the electric field, sense lines in the track pad signal a processor of the device to return to normal operation mode. In another embodiment, a camera may be used to detect whether the user has moved within range of photodetectors during the user detection mode. When the user is detected, normal operating power is restored to the computing device.

In one aspect, a computing device includes a trackpad and a processor. The trackpad includes a plurality of conductive plates. The processor is configured to provide reduced power to at least some components of the computing device in response to a lack of user interaction with the computing device for a predetermined time period. The processor activates the plurality of conductive plates of the trackpad to cause generation of an electric field over the trackpad. The processor then provides normal operating power to the at least some of the computing components in response to an object entering the electric field over the trackpad.

In another aspect, a computer-implemented method includes, in normal operation mode, determining that a user has not interacted with a computing device for a predetermined time period. The computing device is caused to enter user detection mode such that at least some components of the computing device are provided with reduced power. A presence of the user is detected proximate the computing device without requiring the user to touch the computing device. The computing device is then caused to enter normal operation mode in response to the detection of the presence of the user. In the normal operation mode, at least some of the computing device components are provided with normal operating power.

DETAILED DESCRIPTION

The aspects, features and advantages of the present disclosure will be appreciated when considered with reference to the following description of example embodiments and accompanying figures. The following description does not limit the disclosure; rather, the scope is defined by the appended claims and equivalents.

While certain processes in accordance with example embodiments are shown in the figures as occurring in a linear fashion, this is not a requirement unless expressly stated herein. Different processes may be performed in a different order or concurrently.

The disclosure describes the detection of a user in the presence of a computing device using existing hardware, such as a trackpad on a laptop computer. The trackpad may measure a dielectric constant of space above the trackpad using a capacitive sensor. The capacitive sensor may detect a change in the dielectric constant over a distance of up to about fifteen centimeters depending on the size of the trackpad. In the event that a user extends his hand (or some other body part or object) over the trackpad, the hand interferes with the electric field that the trackpad is generating, and the interference can be detected. When the user is detected due to the change in the dielectric constant, the trackpad signals the operating system of the computing device to enter a normal operation mode from a user detection mode.

Figure 1:
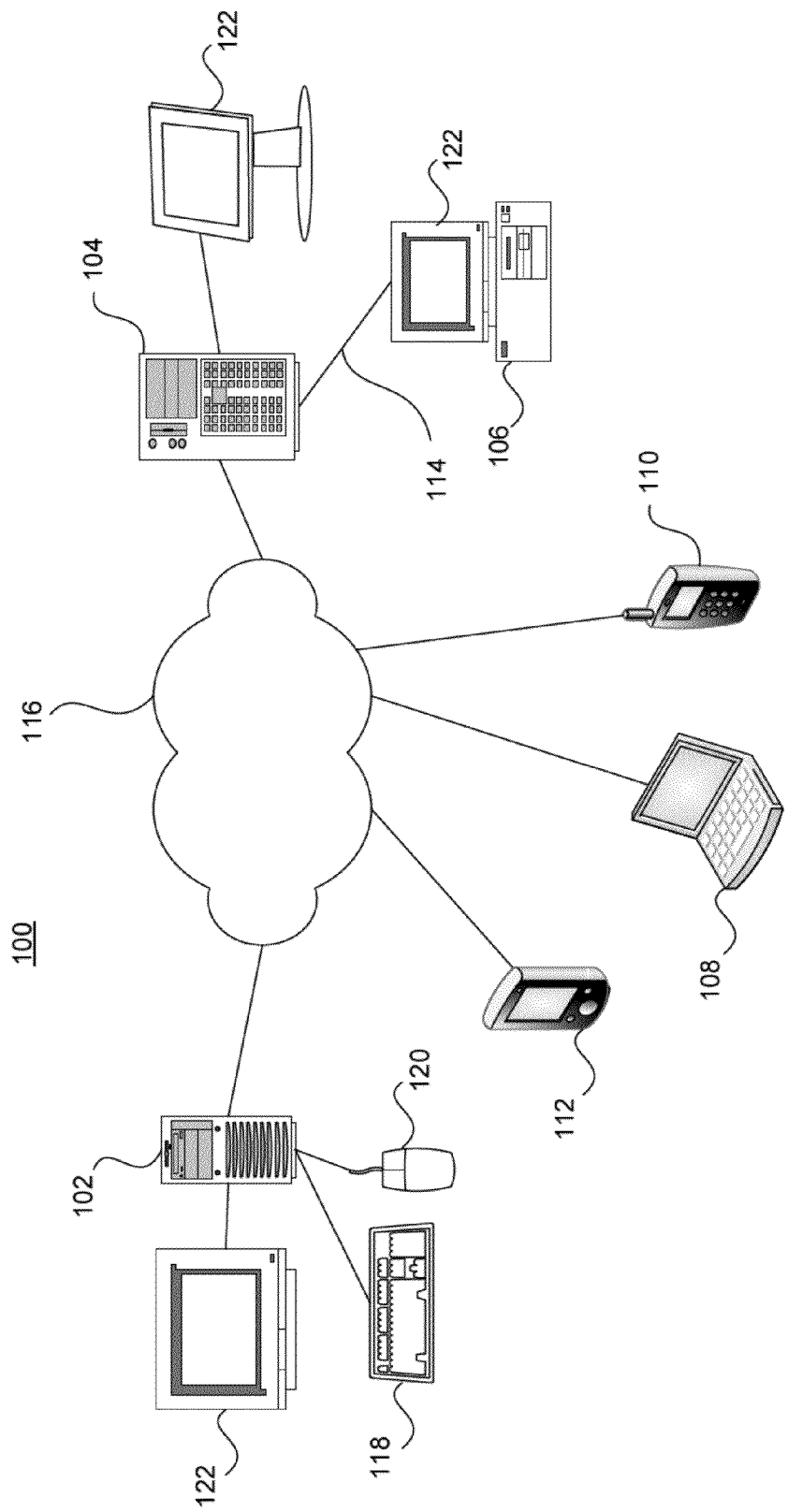
FIG. 1 illustrates a system in accordance with example embodiments.

FIG. 1 presents a schematic diagram of a computer system depicting various computing devices that can be used alone or in a networked configuration in accordance with aspects of the disclosure. For example, this figure illustrates a computer network 100 having a plurality of computers 102, 104, 106, 108 as well as other types of devices such as a mobile phone 110 and a PDA 112. Such devices may be interconnected via a local or direct connection 114 and/or may be coupled via a network 116 such as a LAN, WAN, the Internet, etc., which may be wired or wireless.

Each device may include, for example, one or more processing devices and have user inputs such as a keyboard 118 and mouse 120 and/or various other types of input devices such as pen-inputs, joysticks, buttons, touch screens, trackpads (also referred to as touchpads) etc., as well as a display 122, which could include, for instance, a CRT, LCD, plasma screen monitor, TV, projector, etc. Each computer 102, 104, 106, 108 may be a personal computer, server, etc. By way of example only, computers 102, 106 may be personal computers while computer 104 may be a server and computer 108 may be a laptop.

The computer 104 may communicate with one or more of client computers 102, 106 and/or 108, as well as client devices such as mobile computing device 110 and PDA 112. Each computer or other client device may be similarly configured with a processor, memory and instructions, as well as one or more user input devices 118 and a user output device, such as display 122, as discussed with reference to FIG. 2. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, touch-sensitive pad, speakers, microphone, modem and/or router (telephone, cable or otherwise) and all of the components used for connecting these elements to one another.

Figure 2:
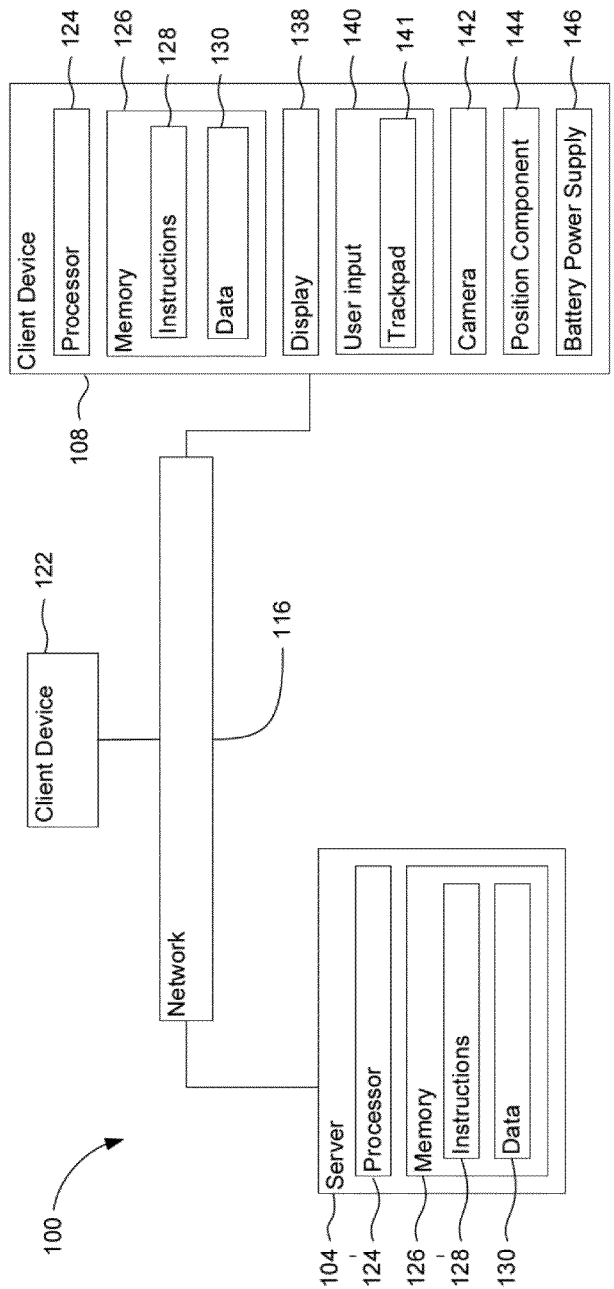
FIG. 2 illustrates aspects of the system of FIG. 1.

The computer 104 and other devices are capable of direct and indirect communication with other computers, such as over network 116. Although only a few computing devices are depicted in FIGS. 1 and 2, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network 116, including any intervening nodes, may be facilitated by any device capable of transmitting data to and from other computers, such as modems (e.g., dial-up or cable), network interfaces and wireless interfaces. Although certain advantages are obtained when information is transmitted or received as noted above, other aspects are not limited to any particular manner of transmission of information. For example, in some aspects, the information may be sent via a medium such as a disk, tape, CD-ROM, or directly between two computer systems via a dial-up modem.

Moreover, computers and user devices in accordance with the systems and methods described herein may comprise any device capable of processing instructions and transmitting data to and from other computers, including network computers lacking local storage capability, PDAs with modems such as PDA 112 and Internet-capable wireless phones such as mobile phone 110.

As shown in FIG. 2, each computer, such as server 104 and client devices 108, 122, contains a processor 124, memory/storage 126 and other components typically present in a computer. For instance, memory/storage 126 stores information accessible by processor 124, including instructions 128 that may be executed by the processor 124 and data 130 that may be retrieved, manipulated or stored by the processor 124. The memory/storage 126 may be of any type or any device capable of storing information accessible by the processor 124, including a computer-readable medium, or other medium that stores data that may be read with the aid of an electronic device, such as a hard-drive, memory card, ROM, RAM, CD-ROM or other optical disks, flash memories, write-capable or read-only memories. In that regard, memory/storage 126 may include short term or temporary storage as well as long term or persistent storage. Systems and methods may include different combinations of the foregoing, whereby different portions of the instructions 128 and data 130 are stored on different types of media.

The processor 124 may comprise any number of well known processors, such as a CPU. Alternatively, the processor 124 may be a dedicated controller for executing operations, such as an ASIC. Although FIG. 2 functionally illustrates the processor 124 and memory 126 as being within the same block, the processor 124 and memory 126 may actually comprise multiple processors and memories that may or may not be stored within the same physical housing. For example, the processor 124 may comprise a collection of processors which may or may not operate in parallel, and memory 126 may be a hard drive or other storage media located in a server farm of a data center. Some or all of the instructions 128 and data 130 may be stored in a location physically remote from, yet still accessible by, the processor 124. For example, data 130 may be distributed and stored across multiple memories 126 such as hard drives or the like. Accordingly, references to a processor, a computer or a memory will be understood to include references to a collection of processors or computers or memories that may or may not operate in parallel.

The instructions 128 may include any set of instructions to be executed directly (such as machine code) or indirectly (such as scripts) by the processor(s). For example, the instructions may be stored as computer code on the computer-readable medium. In that regard, the terms "instructions," "steps" and "programs" may be used interchangeably herein. The instructions 128 may be stored in any computer language or format, such as in object code or modules of source code. The functions, methods and routines of the instructions 128 are described in detail below.

Data 130 may be retrieved, stored or modified by processor 124 in accordance with the instructions 128. The data 130 may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data 130 may include any information sufficient to identify the relevant information, such as descriptive text, proprietary codes, pointers, references to data stored in other memories (including other network locations) or information which is used by a function to calculate the relevant data.

Although the client devices 108, 122 may each comprise a full-sized personal computer, they may alternatively comprise mobile computing devices capable of wirelessly exchanging data. By way of example only, client device 108 may be a laptop computer, a tablet computer, a netbook, a wireless-enabled PDA or a cellular phone capable of obtaining information via the Internet. The client device 108 may have all of the components normally used in connection with a mobile computing device such as processor 124, memory 126, instructions 128 and data 130, as described above. The client device 108 may include an electronic display 138 (e.g., a monitor having a screen, a touch-screen, a projector, a television, a computer printer or any other electrical device that is operable to display information), and user input 140 (e.g., a mouse, keyboard, touch-screen or microphone).

In some aspects, the user input 140 may include a trackpad 141. The trackpad 141 is a pointing device featuring a tactile sensor. The sensor is a specialized surface that can translate motion and position of a user's fingers relative to a position on the screen. Trackpads are a common feature of laptop computers, and are also used as a substitute for a mouse where desk space is scarce. As trackpads vary in size, they may also be used with PDAs and portable media players. Stand-alone trackpads may also be used wirelessly in conjunction with any type of computing device. Trackpads may operate in accordance with a matrix approach or a capacitive shunt method to sense the capacitive virtual ground effect of a user's finger or the capacitance between sensors.

In the matrix approach, a series of conductors are arranged in an array of parallel lines in two layers, separated by an insulator and crossing each other at right angles to form a grid. A high frequency signal is applied sequentially between pairs in this two-dimensional grid array. The current that passes between the nodes is proportional to the capacitance. When a virtual ground, such as a finger, is placed over one of the intersections between the conductive layer, some of the electrical field is shunted to the ground point, resulting in a change in the apparent capacitance at that location.

The capacitive shunt method senses the change in capacitance between a transmitter and receiver that are on opposite sides of the sensor. The transmitter creates an electric field which may oscillate at 200-300 kHz, for example. If a ground point, such as the finger, is placed between the transmitter and receiver, some of the field lines are shunted away, decreasing the apparent capacitance.

The client device 110 may also include a camera 142, geographical position component 144, accelerometer, speakers, a network interface device, a battery power supply 146 or other power source, and all of the components used for connecting these elements to one another.

The geographical position component 144 may be used to determine the geographic location and orientation of the client device 108. For example, the client device 108 may include a GPS receiver to determine the device's latitude, longitude and altitude. Thus, as the client device 108 changes locations, for example by being physically moved, the GPS receiver may determine a new current location. The position component 144 may also comprise software for determining the position of the device 108 based on other signals received at the client device 108, such as signals received at a cellular phone's antennas from one or more cellular phone towers if the client device 108 is a cellular phone, or may be omitted.

In addition to the operations described below and illustrated in the figures, various operations in accordance with aspects of the disclosure will now be described. It should also be understood that the following operations do not have to be performed in the precise order described below. Rather, various steps can be handled in a different order or simultaneously.

Figure 3A:
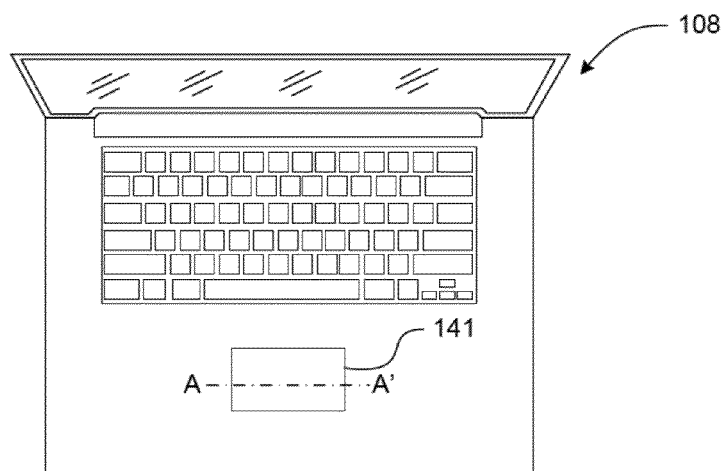
FIGS. 3a-3c are exemplary pictorial diagrams in accordance with example embodiments.
Figure 3B:
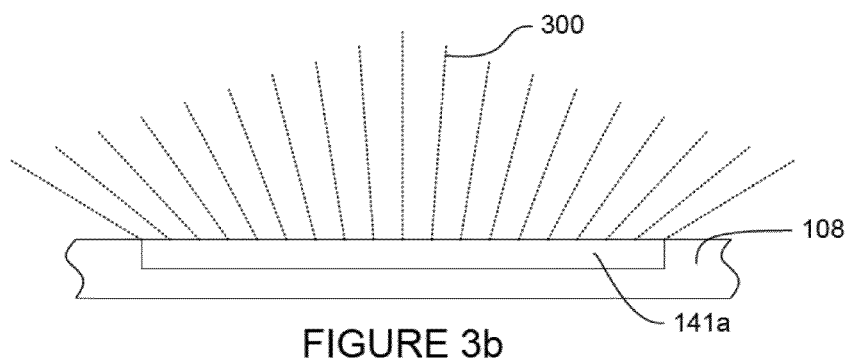
Figure 3C:
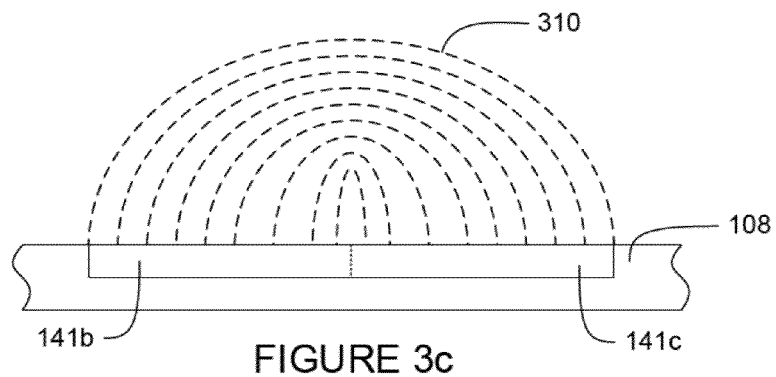

FIG. 3a illustrates the client device 108 as a laptop computer including the trackpad 141. FIGS. 3b and 3c illustrate a cross section of the trackpad 141 along line A-A' shown in FIG. 3a. In normal tracking mode, the trackpad 141 performs fine-grained texture recognition and finger tracking using small conductive plates that sense movement of a user's finger along the trackpad 141. The trackpad 141 is typically driven by drive lines and sense lines. The drive lines and sense lines commonly extend orthogonal to each other. The drive lines may be used for generating an electric field from the trackpad 141, and the sense lines may be used for detecting the electric field.

In the event that the user does not interact with the client device 108 for a predetermined time period, the client device 108 exits normal operation mode and enters user detection mode. During the user detection mode, the amount of current flowing to the trackpad 141 is increased, thereby increasing the electric field generated by the drive lines. The increase in the electric filed emanating from the trackpad 141 increases the sensitivity of the trackpad 141 such that changes to the electric field may be detected further away from the trackpad 141. Accordingly, a user's hand that is positioned within the electric field may be detectable by the sense lines of the trackpad 141.

Even though power provided to the trackpad 141 is increased during user detection mode, the total amount of power consumed by the client device 108 is reduced by operating a minimum amount of client device 108 components. For example, the display may be dimmed or prevented from outputting any data.

In user detection mode, the conductive plates that comprise the trackpad 141 may be configured to be connected in parallel to effectively create a large capacitor. In one embodiment illustrated in FIG. 3b, the parallel connection of the conductive plates causes the trackpad 141 to behave like a single capacitive plate 141a that emits an electric field 300 outwardly in different directions.

In another embodiment illustrated in FIG. 3c, the conductive plates at one half of the trackpad are connected in parallel to form one large positive capacitive sensor 141b and the conductive plates at the other half of the trackpad are connected in parallel to form one large negative capacitive sensor 141c. This configuration generates an electric field 310 between the two capacitive sensors 141b, 141c.

When the client device 108 is in user detection mode, the trackpad 141 may detect the presence of a user proximate the client device 108. The capacitive plate 141a or the capacitive sensors 141b, 141c provided by the conductive plates may measure a dielectric constant of the space above the trackpad 141. The capacitive plate/sensors 141a, 141b, 141c may detect a change in the dielectric constant above the trackpad 141 of about fifteen centimeters depending on the size of the trackpad 141.

Figure 4A:
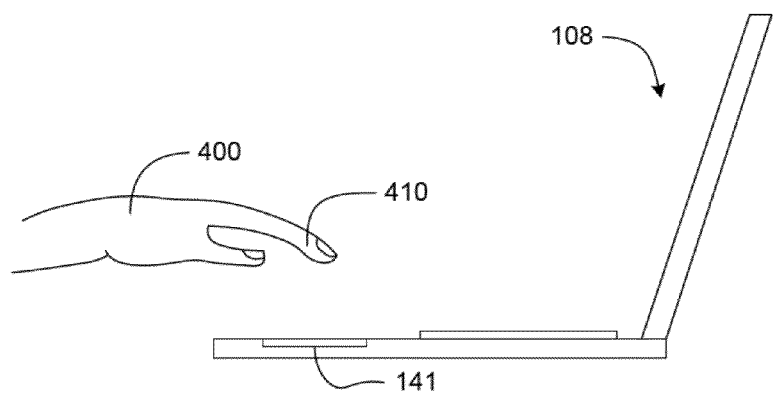
FIGS. 4a-4c are exemplary pictorial diagrams in accordance with example embodiments.
Figure 4B:
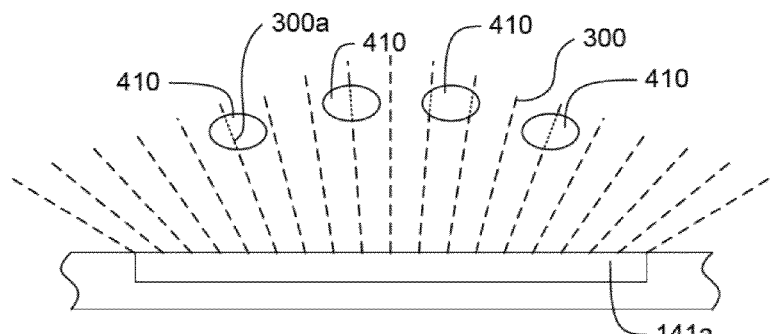
Figure 4C:
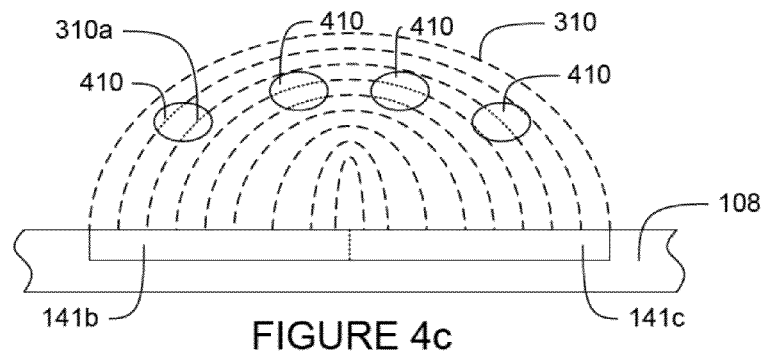

FIG. 4a illustrates a side view of a laptop with a user's hand 400 extended over the trackpad 141. FIG. 4b is similar to FIG. 3b but with the user's hand 400 extended over the trackpad 141. FIG. 4c is similar to FIG. 3c but with the user's hand 400 extended over the trackpad 141.

Referring to FIG. 4b, in the event that a user extends his hand 400 or fingers 410 over the trackpad 141, the hand 400 provides a different dielectric constant for the electric field 300 to pass through. The interference provided by the hand 400 or fingers 410 may result in electric field 300a passing through the user's hand 400 or fingers 410. The sense lines of the trackpad 141 may detect the different dielectric constant provided by the user's hand 400 and fingers 410, and then signal a processor associated with the trackpad 141 that the user has been detected in the presence of the client device 108. The processor may then signal the client device 108 to return to the normal operating mode from the user detection mode.

Referring to FIG. 4c, the user may extend his hand 400 or fingers 410 over the conductive sensors 141b, 141c of the trackpad 141 thereby interfering with the electric field 310 generated between the two capacitive sensors 41b, 141c. The tissue of the user's hand 400 provides a different medium for the electric field 310 to pass through. In other words, the interference provided by the hand 400 or fingers 410 results in electric field 310a passing through the hand 400. The change in the dielectric constant provided by the user's hand 400 and fingers 410 may be detected by the sense lines in the trackpad 141. In response to the user detection, the client device 108 moves from the user detection mode to the normal operation mode. During normal operation mode, all of the components of the client device 108 that are usually operational during a user session are activated.

Figure 5:
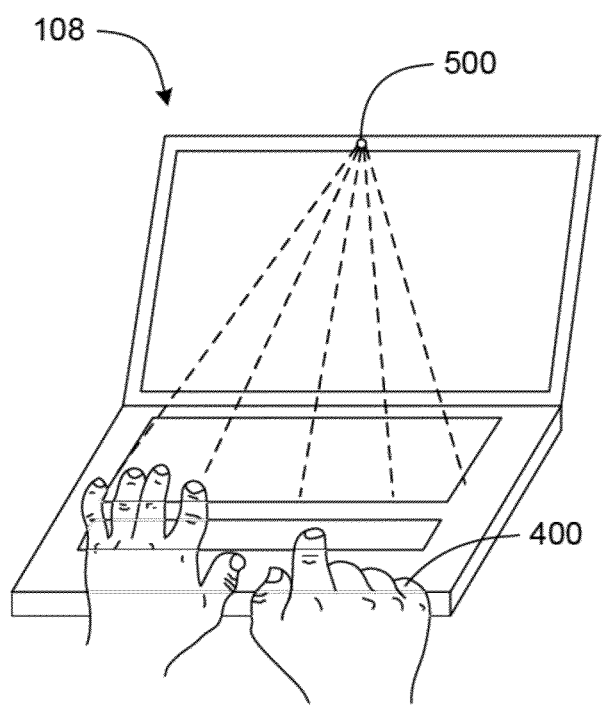
FIG. 5 is another pictorial diagram in accordance with example embodiments.

Referring to FIG. 5, in another embodiment, a user may be detected in the presence of the client device using a camera 500 rather than the trackpad 141. During user detection mode, the camera 500 is provided with sufficient power to detect movement in range of the photodetectors of the camera 500. Other, nonessential computing components are powered down or are provided with low level power. When a user moves his hand 400 within range of the camera 500 such that the user's presence is detected, the client device 108 enters normal operating mode, as described above. In one embodiment, the camera may capture an image once every few seconds rather than more frequently in order to conserve power.

Figure 6:
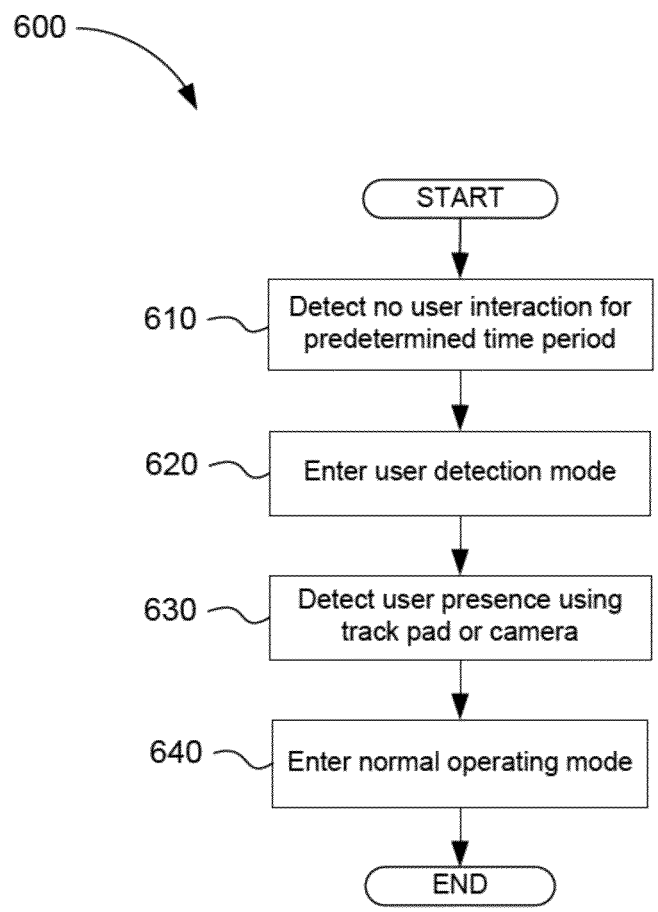
FIG. 6 is an exemplary flow diagram in accordance with example embodiments.

FIG. 6 illustrates a process 600 of detecting the presence of a user proximate a computing device. The process 600 begins when a user does not interact with the computing device for a predetermined time period (block 610). For example, the user may interact with the computing device in a normal operating mode for ten minutes and then may walk away from the computing device without turning off the power. A determination is then made as to how much time has elapsed since the user has interacted with the computing device.

In the event that the user has not interacted with the computing device for the predetermined time period (e.g., five minutes), the computing device enters user detection mode (block 620). In user detection mode, the component that is primarily responsible for detecting the user (e.g., trackpad or camera) is provided with a sufficient amount of power to operate effectively. However, other nonessential computing components are powered down or are provided with a low level of power to promote energy conservation.

In user detection mode, the trackpad or the camera detects the presence of the user proximate the computing device (block 630). The trackpad generates an electric field that is able to detect the presence of the user's hand since the user's hand provides a different dielectric constant than air for the electric field to pass through. The camera may detect the user's presence by comparing different images captured since entering user detection mode. Generally, the images will remain substantially the same until a user comes within range of the computer (e.g., within an area detectable by the camera). When the images begin to change from previously captured images, the camera may signal the computing device that a user has been detected.

When a user is detected proximate the computing device, the computing device enters normal operation mode (block 640). In normal operation mode, the computing device provides normal operating power to all components in anticipation that the user will soon begin interacting with the device once again.

As described above, a computing device may detect the presence of a user without the addition of any new hardware. When a user has not interacted with the computing device for a predetermined time period, the device enters a user detection mode from a normal operation mode such that nonessential components are powered down or are provided with low level power. In one embodiment, a trackpad may be used to detect the presence of the user in the user detection mode. An electric field is generated by conductive plates of the trackpad. When the user extends his hand over the trackpad to interfere with the electric field, sense lines in the trackpad signal a processor of the device to return to the normal operation mode. In another embodiment, a camera may be used to detect whether the user has moved within a detectable range of camera photodetectors during user detection mode. When the user is detected, full power is restored to the computing device.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computing device comprising:
a plurality of computing device components;
a trackpad comprising a plurality of conductive plates; and
a processor configured to:
provide reduced power to at least some of the computing device components and provide increased power to the trackpad in response to a lack of user interaction with the computing device for a predetermined time period such that an overall power consumption by the computing device is decreased,
activate the plurality of conductive plates of the trackpad to cause generation of an electric field over the trackpad using the increased power to the trackpad, and
provide normal operating power to the at least some of the computing device components and to the trackpad in response to an object entering the electric field over the trackpad without the object touching the trackpad.

2. The computing device of claim 1, wherein the object comprises the user's hand.

3. The computing device of claim 1, wherein the processor provides reduced power to the at least some of the computing device components by causing a power supply to reduce power provided to the at least some of the computing device components.

4. The computing device of claim 1, wherein the processor detects when an object enters the electric field in response to the object interrupting the electric field.

5. The computing device of claim 1, wherein the trackpad further comprises a plurality of sense lines coupled to the conductive plates, the interruption of the electric field by the object being detected by the sense lines.

6. The computing device of claim 5, wherein sense lines detect the interruption of the electric field by the object by detecting a change in a dielectric constant over the trackpad.

7. The computing device of claim 5, wherein, in response to detecting the interruption of the electric field by the object, the sense lines cause a signal to be forwarded to the processor indicating that the object interrupted the electric field.

8. The computing device of claim 1, wherein the trackpad further comprises a plurality of drive lines coupled to the conductive plates, the drive lines generating the electric field.

9. The computing device of claim 1, wherein the conductive plates are activated by connecting at least some of the plurality of the conductive plates in parallel such that the at least some of the conductive plates behave as a capacitive sensor.

10. The computing device of claim 9, wherein the at least some of the conductive plates are connected such that the trackpad behaves as a single conductive plate, the electric field emanating outwardly from the trackpad.

11. The computing device of claim 9, wherein the at least some of the conductive plates are connected such that a first portion of the trackpad behaves as a positive capacitive sensor and a second portion of the trackpad behaves as a negative capacitive sensor, the electric filed emanating between the first portion and the second portion of the trackpad.

12. A computer-implemented method that when executed by a processor causes the processor to perform steps of the method, the steps comprising:
in normal operation mode, determining that a user has not interacted with a computing device for a predetermined time period;
responsive to determining that the user has not interacted with the computing device for the predetermined time period, causing the computing device to enter user detection mode, wherein at least some components of the computing device are provided with reduced power in the user detection mode and a trackpad of the computing device is provided with increased power in the user detection mode such that an overall power consumption of the computing device is decreased in the user detection mode;

responsive to entering the user detection mode, activating a plurality of conductive plates of the trackpad to cause generation of an electric field over the trackpad;

detecting a presence of the user proximate the computing device using the trackpad in the user detection mode, wherein the presence of the user is detected without the user touching the computing device; and causing the computing device to enter normal operation mode in response to the detection of the presence of the user, wherein the at least some of the computing device components and the trackpad are provided with normal operating power in the normal operation mode.

13. The method of claim 12, wherein the presence of the user is detected in response to an object interrupting the electric field and the trackpad detecting a change in a dielectric constant over the trackpad caused by the object.

14. The method of claim 12, wherein activating the plurality of the conductive plates of the trackpad comprises connecting at least some of the plurality of the conductive plates in parallel such that the at least some of the conductive plates behave as a capacitive sensor.

15. The method of claim 14, wherein the at least some of the conductive plates are connected such that the trackpad behaves as a single conductive plate, the electric field emanating outwardly from the trackpad.

16. The method of claim 14, wherein the at least some of the conductive plates are connected such that a first portion of the trackpad behaves as a positive capacitive sensor and a second portion of the trackpad behaves as a negative capacitive sensor, the electric filed emanating between the first portion and the second portion of the trackpad.

17. A non-transitory computer readable storage medium comprising instructions, that when executed by a processor, cause the processor to perform a method comprising:

in normal operation mode, determining that a user has not interacted with a computing device for a predetermined time period;

responsive to determining that the user has not interacted with the computing device for the predetermined time period, causing the computing device to enter user detection mode, wherein at least some components of the computing device are provided with reduced power in the user detection mode and a trackpad of the computing device is provided with increased power in the user detection mode such that an overall power consumption of the computing device is decreased in the user detection mode;

responsive to entering the user detection mode, activating a plurality of conductive plates of the trackpad to cause generation of an electric field over the trackpad;

detecting a presence of the user proximate the computing device using the trackpad in the user detection mode, wherein the presence of the user is detected without the user touching the computing device; and causing the computing device to enter normal operation mode in response to the detection of the presence of the user, wherein the at least some of the computing device components and the trackpad are provided with normal operating power in the normal operation mode.

18. The computer readable storage medium of claim 17, wherein the presence of the user is detected in response to an object interrupting the electric field and the trackpad detecting a change in a dielectric constant over the trackpad caused by the object.

19. The computer readable storage medium of claim 17, wherein activating the plurality of the conductive plates of the trackpad comprises connecting at least some of the plurality of the conductive plates in parallel such that the at least some of the conductive plates behave as a capacitive sensor.

20. The computer readable storage medium of claim 19, wherein the at least some of the conductive plates are connected such that the trackpad behaves as a single conductive plate, the electric field emanating outwardly from the trackpad.

21. The computer readable storage medium of claim 19, wherein the at least some of the conductive plates are connected such that a first portion of the trackpad behaves as a positive capacitive sensor and a second portion of the trackpad behaves as a negative capacitive sensor, the electric filed emanating between the first portion and the second portion of the trackpad.

* * * * *